(12) United States Patent
Abdoun et al.

(10) Patent No.: US 11,561,962 B2
(45) Date of Patent: Jan. 24, 2023

(54) SYSTEM AND METHOD FOR DETECTING CHANGES IN WEBPAGES AND GENERATING METRIC CORRELATIONS THEREFROM

(71) Applicant: Content Square SAS, Paris (FR)

(72) Inventors: Sihem Abdoun, Paris (FR); Vincent Colombet, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 16/935,404

(22) Filed: Jul. 22, 2020

(65) Prior Publication Data
US 2022/0027340 A1     Jan. 27, 2022

(51) Int. Cl.
*G06F 16/23*     (2019.01)
*G06F 16/958*    (2019.01)
*G06F 16/955*    (2019.01)

(52) U.S. Cl.
CPC ........ *G06F 16/2365* (2019.01); *G06F 16/958* (2019.01); *G06F 16/9566* (2019.01)

(58) Field of Classification Search
CPC ........................... G06F 16/2365; G06F 16/958
See application file for complete search history.

(56) References Cited

U.S. PATENT DOCUMENTS

| 8,924,338 B1 * | 12/2014 | Sheng | ................. | G06F 16/1873 706/52 |
| 2013/0275493 A1 * | 10/2013 | Chan | .................... | G06F 16/955 709/203 |

| 2016/0110455 A1 * | 4/2016 | von Bochmann | ...... | G06F 40/14 707/709 |
| 2018/0191764 A1 | 7/2018 | Chawla et al. | | |
| 2019/0026838 A1 * | 1/2019 | Tan | ........................ | G06Q 10/10 |

FOREIGN PATENT DOCUMENTS

| WO | 2016078479 A1 | 5/2016 |
| WO | 2022018492 | 1/2022 |

OTHER PUBLICATIONS

The International Search Report and the Written Opinion of the International Searching Authority for PCT/IB2020/056901, dated Sep. 30, 2020, ISA/EPO, Rijswijk, Netherlands.

* cited by examiner

*Primary Examiner* — Taelor Kim
(74) *Attorney, Agent, or Firm* — Schwegman Lundberg & Woessner, P.A.

(57) ABSTRACT

A system and method for detecting changes in webpages are provided. The method includes creating a snapshot for a webpage addressed by an identifier, wherein the identifier is designated in a received request for detecting changes in the webpage, wherein the created snapshot is a current snapshot of a most recent version of the webpage; retrieving at least one recent snapshot of the webpage, wherein the recent snapshot was created immediately prior to the current snapshot and represents an immediate previous version of the webpage; and comparing the current snapshot to the at least one recent snapshot to detect any changes, wherein the comparison is based on changes in visible elements in the webpage.

21 Claims, 7 Drawing Sheets

SYSTEM AND METHOD FOR DETECTING CHANGES IN WEBPAGES AND GENERATING METRIC CORRELATIONS THEREFROM

TECHNICAL FIELD

The present disclosure relates generally to tracking visitors of websites, and, specifically, to detection of webpage changes and generation of metric correlations.

BACKGROUND

As internet technology expands with the evolution of devices, networks, and software, web-based applications remain popular for purposes such as communication, commerce, entertainment, and others. A primary advantage of web-based technology, specifically websites and other browser-based content, is the potential for reliable, stable interfaces which provide smooth user experiences while requiring little or no technical training. In order to preserve a seamless user experience while continuing to update website features, administrators, developers, and other site managers may seek to understand the impact website changes have on site traffic.

While a website may include many features designed to engage users to create seamless experiences, seemingly-minor changes can disrupt a user's site experience. For example, a user accustomed to a shopping site's "cart" button disposed in the top-right of the site might become confused if the same button were moved to the top-left corner. As negative user experiences can impact site engagement and detract from the site administrator's efforts to meet their goals, the impact that website changes have on user engagement, and other metrics, may be of interest to site administrators and operators. A first key step in identifying relationships between these metrics and various changes to a site is the identification of website changes.

Changes to a website may appear minor, but may have far-reaching, potentially negative, business impacts. A site operator or administrator may wish to understand the changes implemented in a given site on a regular basis, maintaining a working understanding of how the site is evolving. As major websites may employ dozens or even hundreds of contributors to improve the site and user experience, tracking every change in a standardized fashion may be difficult or impossible, as changes may be entered faster than change lists can be compiled.

In addition, as site visitors may not be sufficiently engaged with a website to notice gradual page changes, such changes may be difficult for returning users to detect, creating frustrating user experiences which detract from website performance. As user engagement may represent a significant portion of a web-based business's revenues, changes which impact user experience may have far-reaching effects. The monitoring and reduction of detrimental webpage changes may create a significant opportunity to improve site performance and increase user satisfaction and brand loyalty.

Further, as change tracking may require a significant outlay of time on the part of those contributors implementing the changes, managers and site administrators may prefer solutions which provide for automated, regular change tracking, allowing for subsequent correlations with site metrics to understand the impact of various changes on site engagement and goal achievement. While present solutions, including webpage-based change detection and notification (CDN) applications, such as Versionista™, and browser-based tools, such as Distill Web Monitor™, may address some aspects of these administrators', managers', and operators' needs, current solutions fail to fully address the growing need for website change tracking and metric correlation generation.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting changes in webpages. The method comprises creating a snapshot for a webpage addressed by an identifier, wherein the identifier is designated in a received request for detecting changes in the webpage, wherein the created snapshot is a current snapshot of a most recent version of the webpage; retrieving at least one recent snapshot of the webpage, wherein the recent snapshot was created immediately prior to the current snapshot and represents an immediate previous version of the webpage; and comparing the current snapshot to the at least one recent snapshot to detect any changes, wherein the comparison is based on changes in visible elements in the webpage.

In addition, certain embodiments disclosed herein include a system for detecting changes in webpages. The system comprises a processing circuitry; and a memory, the memory containing instructions that, when executed by the processing circuitry, configure the system to: create a snapshot for a webpage addressed by an identifier, wherein the identifier is designated in a received request for detecting changes in the webpage, wherein the created snapshot is a current snapshot of a most recent version of the webpage; retrieve at least one recent snapshot of the webpage, wherein the recent snapshot was created immediately prior to the current snapshot and represents an immediate previous version of the webpage; and compare the current snapshot to the at least one recent snapshot to detect any changes, wherein the comparison is based on changes in visible elements in the webpage.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
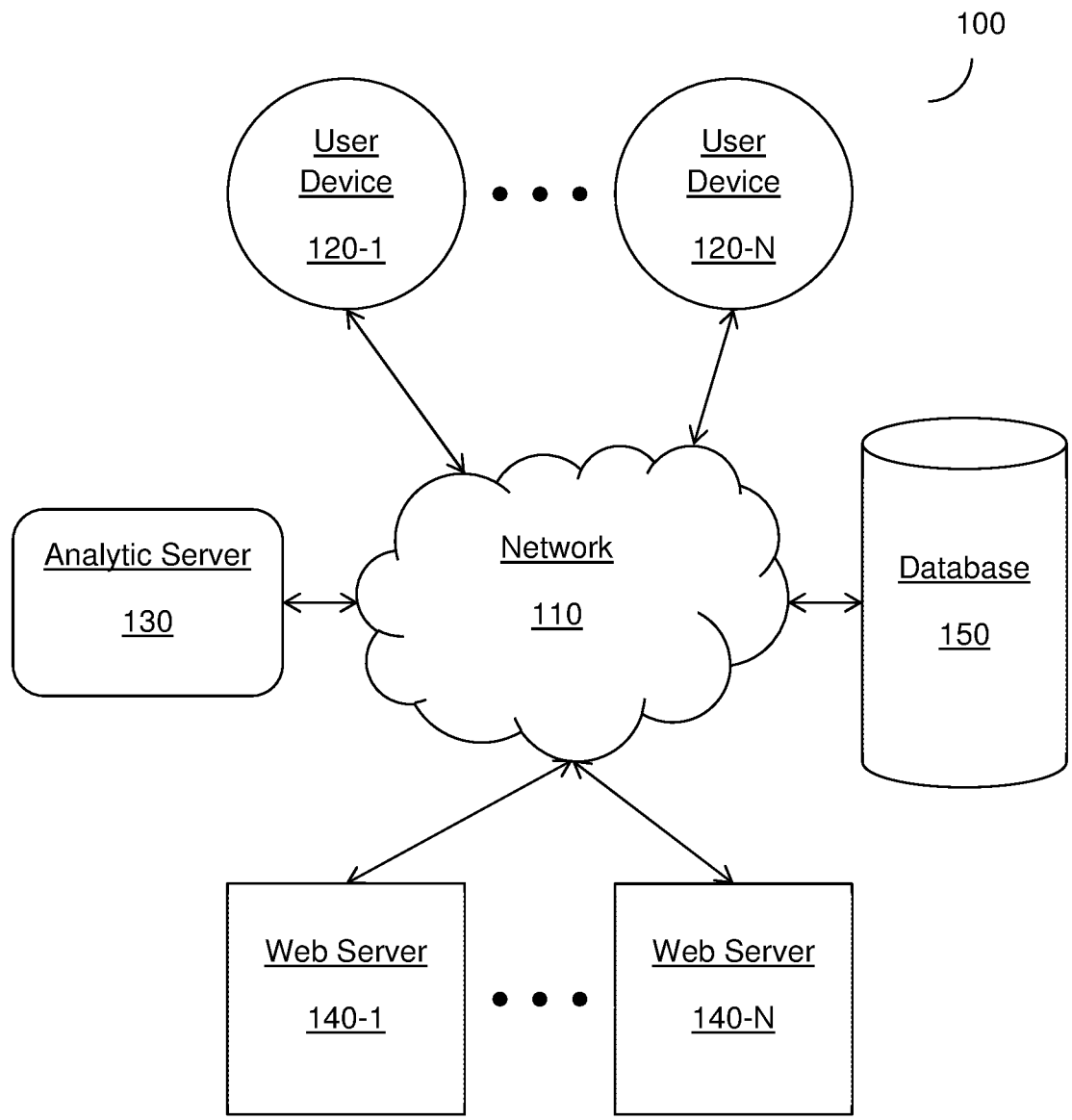
FIG. 1 is a network diagram depicting a network system disclosing the embodiments for detecting changes in webpages and generating metric correlations therefrom.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some embodiments include techniques for detecting changes in webpages and generating metric correlations therefrom. Webpages may be regularly updated to address evolving administrator or visitor requirements, and changes implemented may detract from user experience and website goal achievement. The disclosed embodiments address the need for webpage change detection and correlation of changes with user experience metrics, providing site administrators and operators with a persistent understanding of the impact which changes have on website engagement and goal achievement. In an embodiment, the website is an e-commerce website.

The disclosed embodiments further provide technique improvements over existing solutions. For example, the disclosed embodiments provide solutions for immediately comparing between versions of webpages, where only one version is live, and determining the impact of a change on the user experience based on past performance or engagement. Further, the disclosed embodiments technically improve the regular change tracking and correlation with site metrics capabilities with features enabling an operator, administrator, or other user to understand the impact of various changes on site engagement and goal achievement.

FIG. 1 is an example network diagram depicting a network system 100 disclosing the embodiments for detecting changes in webpages and generating metric correlations therefrom. The system 100 includes one or more user devices, 120-1 through 120-N (hereinafter, "user device" 120 or "user devices" 120), an analytic server 130, one or more web servers, 140-1 through 140-N (hereinafter "web server" 140 or "web servers" 140), and a database 150. Further, in the system 100, the various components listed are interconnected via a network 110.

The network 110 provides interconnectivity between the various components of the system. The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be a full-physical network, including exclusively physical hardware, a fully-virtual network, including only simulated or otherwise virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect to the various components of the system 100 via wireless means such as, as examples and without limitation, Bluetooth™, long-term evolution (LTE), Wi-Fi, other, like, wireless means, and any combination thereof, via wired means such as, as examples and without limitation, ethernet, universal serial bus (USB), other, like, wired means, and any combination thereof. Further, the network 110 may be configured to connect with the various components of the system 100 via any combination of wired and wireless means.

The user devices 120 may be devices allowing a user to interact with the system 100 for purposes including, as examples and without limitation, providing webpage requests to the system 100 for analysis, receiving returns or outputs from the web servers 140 to view webpage or other content developed by any of the web servers 140. A user device 120 typically includes a web browser (now shown) or any application (virtual, web, mobile, and the like) which allows a user to view, download, interact with, and engage with content provided by the web servers 140. Examples of user devices 120 may be smartphones, personal computers, business systems, dedicated kiosks, tablet computers, and other, like, devices.

In an embodiment, a user device 120 may be operated by an administrator of one or more websites hosted by the web servers 140. Through the user device 120, reports generated by the analytic server 130 may be viewed. The user device 120 may further allow a user to configure one or more components of the system 100, as well as any processes executed thereby, to provide instructions for the manipulation of data, or to manipulate data.

The analytic server 130, depicted in detail with respect to FIG. 7, below, is a system configured to execute instructions, organize information, and otherwise process data. The analytic server 130 may be configured to execute the methods described hereinbelow, other, like, methods, and any combination thereof. As described with respect to FIG. 7, below, the analytic server 130 may include various processing, memory, networking, and other components allowing the analytic server 130 to execute instructions and provide data processing. The analytic server 130 may be implemented as physical hardware, as software virtualizing physical hardware, or as a combination of physical and virtualized components. The analytic server 130 may be connected to the network 110 via those means described with respect to the network 110, above.

According to the disclosed embodiments, the analytic server 130 is configured to detect webpage changes and generate metric correlations therefrom. A webpage change is any alteration of an element which is visible to a site visitor, or with which a site visitor interacts. Examples of webpage changes may include changing the image displayed in an advertisement banner, changing the size of a text-entry field, changing the location of a button within the page, and other, like, changes. The various processes performed by the analytic server 130 are discussed in greater detail below.

The web servers 140 may be one or more web sources. The web servers 140 may include data relating to websites, data relating to webpages, other, like, data, and any combination thereof. Data from the web servers 140 may be stored in the database 150 and may be processed by the analytic server 130. Web servers 140 may be local sources, remote sources, or any combination thereof. Examples of web servers 140 include, without limitation, repositories of webpage information, repositories of webpage element or zone classifications, "live" webpages, other, like, sources, and any combination thereof. Web servers 140 may be connected with the network 110 via the means described hereinabove.

The database 150 is a data store configured to archive data permanently or semi-permanently. The database 150 may be configured to store information received from one or more web servers 140, user devices 120, and other, like, components, as well as to store data relevant to the operation of the analytic server 130 and any outputs therefrom. The database 150 may be a local system, a remote system, or a hybrid remote-local system. Further, the database 150 may be configured as a full-physical system, including exclusively physical components, as a virtualized system, including virtualized components, or as a hybrid physical-virtual system.

Examples of devices which may be configured as a database 150 in the system 100 include, without limitation, local database hardware, cloud storage systems, remote storage servers, other, like, devices, and any combination thereof.

According to an embodiment, the database 150 may be configured to store or otherwise archive data relating to detection of changes within webpages, various webpage metrics, and generated correlations between such changes and such metrics. Further, the database 150 may be configured to transfer, to and from the analytic server 130, data necessary for the execution of the methods described hereinbelow, and may store or otherwise archive analytic server 130 inputs, analytic server 130 outputs, or both.

Figure 2:
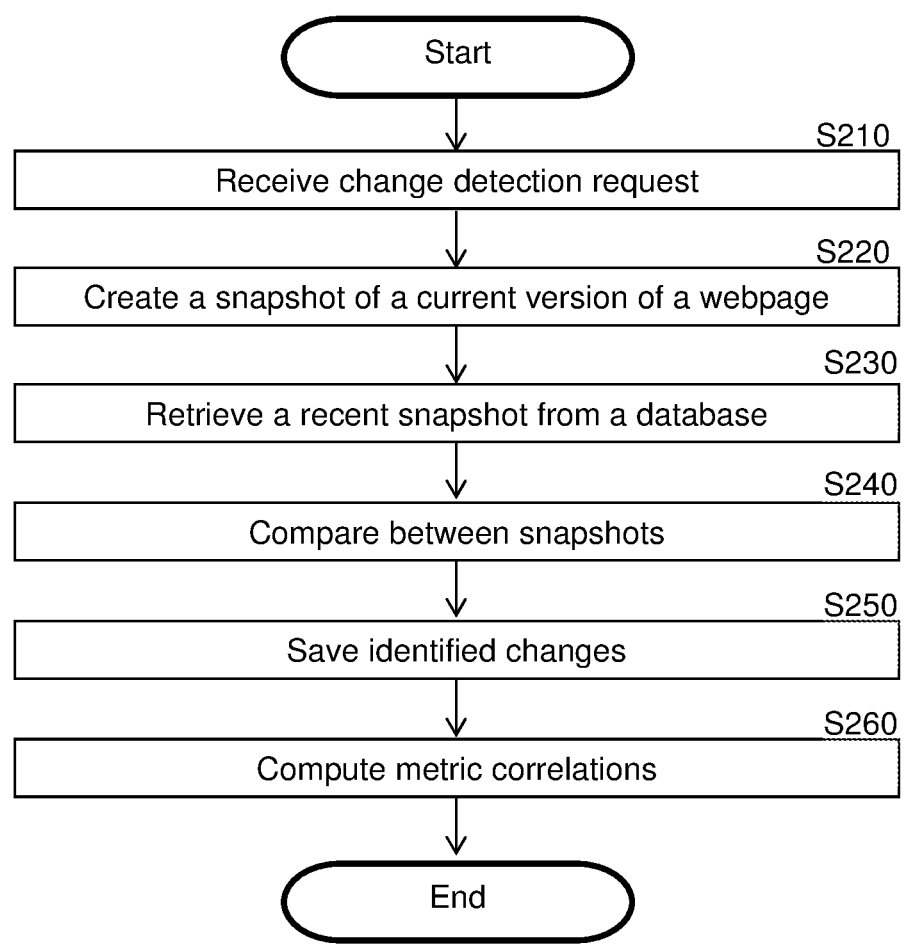
FIG. 2 is a flowchart describing a method for detecting changes in a webpage, according to an embodiment.

FIG. 2 is an example flowchart 200 describing a method for detecting changes in webpages, according to an embodiment.

At S210, a change detection request is received to initiate the process for detecting changes in webpages of a tracked website. The request may be for a periodic detection occurring on a regular, recurring basis at predetermined intervals. Examples of periodic detection may include daily detection, weekly detection, monthly detection, and the like. Detection includes identification and collection of webpage changes, including identification and collection of webpage changes according to those methods described hereinbelow. In an embodiment, once initiated, periodic detection may occur on an ongoing basis until terminated. Periodic detection may be terminated upon execution of a predetermined number of detection cycles, upon reaching a predetermined trigger date, according to other, like, factors, and any combination thereof.

Periodic detection may be initiated upon receipt of a webpage change detection request, or based on other, like, initiating triggers. A webpage change detection request may include a specification of one or more uniform resource locators (URLs), a predefined detection interval, a predefined termination trigger date or count, other, like, information, and any combination thereof. A webpage change detection request may be received by a system executing a method for detecting changes in a website, such as the analytic server, 130, of FIG. 1, above. Further, a webpage change detection request may be received from one or more user devices, such as the user devices, 120, of FIG. 1, above. In an embodiment, change detection is initiated on-demand.

At S220, a snapshot and a respective snapshot ID are created for the webpage addressed by the uniform resource locator (URL), or any identifier, included in the request. In an embodiment, the snapshot includes only visible elements in the webpage, that is, hidden elements are excluded in the snapshot. A snapshot is a representation of a webpage at a given date or time, based on the HTML elements and structures scraped at S250, the page resources downloaded at S270, other, like, data, and any combination thereof. Snapshots may be generated or updated based on all relevant data collected or downloaded for a given URL at a given date or time, as defined based on the periodic detection schedule defined with respect to S210. The created snapshots are saved in a database, such as the database, 150, of FIG. 1, above. The method for creating a snapshot is further discussed in FIG. 3, below.

At S230, at least one recent snapshot is retrieved from the database. The recent snapshot is the snapshot created for the designated webpage immediately prior to a current snapshot created at S220.

At S240, the at least one recent snapshot is compared to the current snapshot to identify any differences in the webpage. In an embodiment, snapshots may be compared by filtering the various snapshots and comparing the filtered snapshots to other filtered snapshots for the same URL. Snapshots may be filtered by extracting, from the HTML code of a given snapshot, a document object model (DOM) tree including only those elements relevant to change detection. A DOM tree may be extracted from snapshot HTML code by application of one or more scripts, applications, or other software features configured to convert HTML code into DOMs. Elements not relevant to change detection may be identified and excluded on the basis of characteristics such as, as examples and without limitation, whether the element is invisible to a site visitor, whether the element is hidden from a site visitor, such as by another element, whether the element is insignificant in site navigation, whether the element has an invalid tag, by other, like, characteristics, and any combination thereof. In an embodiment, snapshots may be filtered by application of techniques including, without limitation natural language processing (NLP) analysis, wherein the HTML code of a webpage is parsed as text and characters, strings, and other text features are compared with predefined HTML dictionaries to identify text matching various HTML elements and hierarchical structures.

In an embodiment, S240 includes extracting a filtered DOM from the HTML code underlying one or more snapshots, the elements or "nodes" of the filtered DOM may be hashed to produce single-string or other small-file-size data features describing fully the elements or "nodes" of the filtered DOM, where each individual element or "node" is hashed independently. Hashes of elements or "nodes," or properties thereof, of the filtered DOM may be generated by application of one or more hashing algorithms configured to convert DOM elements into hash values. Where the elements or "nodes" of the filtered DOM are successfully hashed, the individual hashes may be compared against the corresponding hashes of previous snapshots of the same URL to detect webpage changes. Comparison of hashes may be achieved by methods including, without limitation, the method described with respect to FIG. 5, below, by other, like, methods, and any combination thereof.

At S250, changes and change targets are saved. Where changes are detected at S240, the detected changes, and the targets of such changes, may be saved to a database, 150. Changes may include detected changes, change amplitudes, other, like, features, and any combination thereof. Change targets may include the elements involved in the one or more detected changes, as well as the page resources relevant thereto. Change targets may be saved as HTML code, as DOM elements or "nodes," as other, like, data features, or as any combination thereof.

At S260, metric correlations are computed. A correlation metric is data feature describing relationships between various engagement metrics of interest and the determined changes and change amplitudes. Metrics of interest describe various aspects of site performance and may be applicable to the monitoring and improvement of one or more websites or pages. Metrics of interest may include, as examples and without limitation, the number or percent of visitors who complete a transaction on a shopping site, the average amount of time spent browsing a particular webpage, the maximum recorded page loading time experienced by any user, the lowest number of clicks made by a single user within a given set of webpages, other, like, metrics, and any combination thereof.

Metric correlations may be computed based on one or more processes including, without limitation, identification of patterns within collected metric data, as such patterns may be related to various webpage changes and change amplitudes, as well as other, like, techniques and any combination thereof. Correlated patterns may be determined by, as an example and without limitation, establishing baseline values for applicable metrics of interest, detecting metric deviations from the established baseline values, including deviations above or below predetermined thresholds, identification of detected changes, and the changes' amplitudes, which are approximately concurrent with, or which precede, the identified deviations, and reporting observed pattern correlations.

As an example, a webpage operator may specify a goal regarding webpage newsletter subscriptions. In the same example, where a baseline rate of newsletter subscriptions is identified, the impact of a change to a subscription field, such as moving the field on the webpage, may be determined by comparing detected changes to the subscription field, and the amplitude of those changes, with observed deviations in the newsletter subscription rate. Metric correlations may be reported as described above with respect to detected changes and change amplitudes.

In another embodiment, S260 may include generating one or more alerts where discontinuities in analysis are detected. Discontinuities in analysis may include factors such as, as an example, and without limitation, invalid specified date ranges, wherein the executing system includes insufficient records, or no records, for a given specified time period, rendering analysis inaccurate or impossible.

Figure 3:
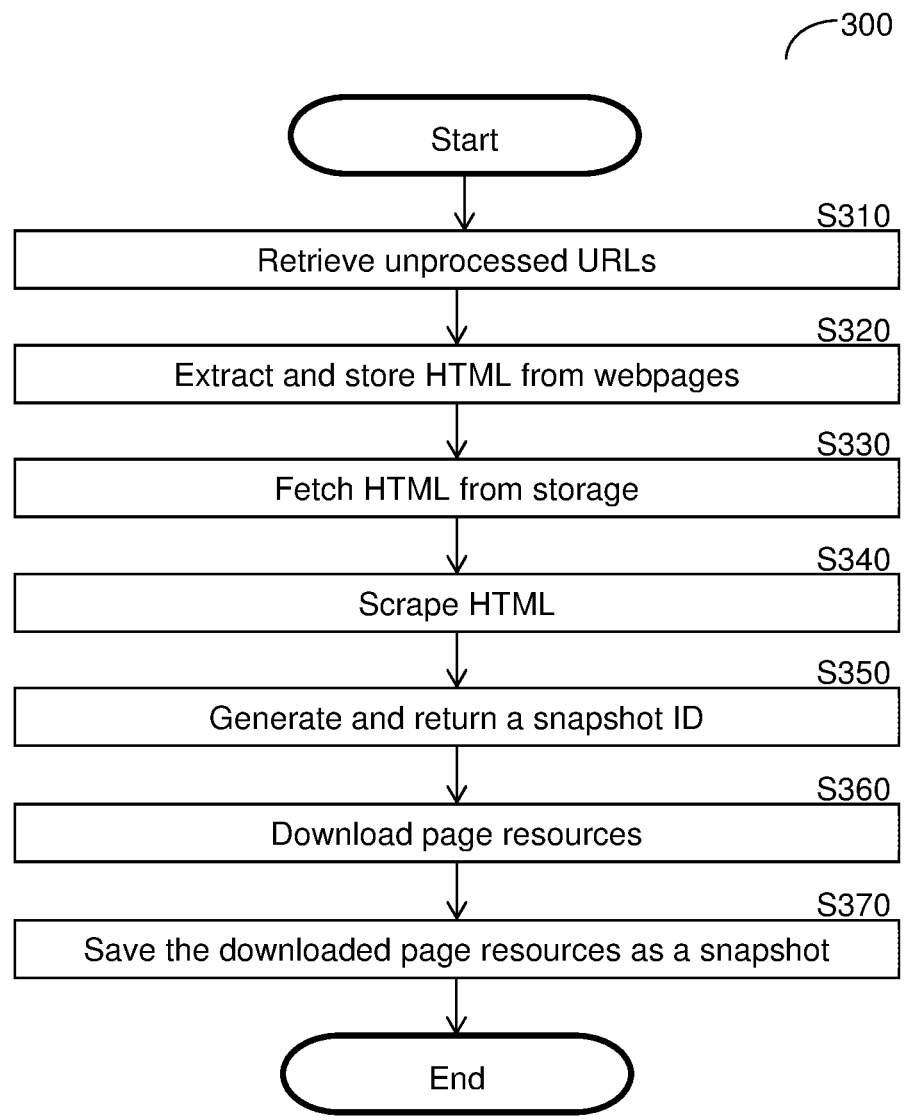
FIG. 3 is a flowchart describing a method for creating snapshots according to an embodiment.

FIG. 3 is an example flowchart 300 describing a method for creating snapshots of webpages, according to an embodiment.

At S310, each uniform resource locator (URL) designated in a request received at S210 is accessed and webpages addressed by each URL is retrieved. The URLs include URLs for specific websites, webpages, or website or page elements or features. The retrieved URLs, and the webpages addressed by such URLs, are retrieved from one or more pre-defined lists of URLs, where such lists may be stored, temporarily, semi-permanently, or permanently, in, for example, a database, such as the database, 150, of FIG. 1, above. In an embodiment, at S310, one or more URLs designated in the request received at S210 may be added to one or more pre-defined URL lists, such as those described hereinabove, including temporarily, semi-permanently, or permanently.

At S320, code is extracted from webpages and stored. The code may be any programming language code utilized to design or run webpages. Examples for such languages may include hypertext markup language (HTML), JavaScript, CSS, Python, PHP, SQL, and the like. Without limiting the scope of the disclosed embodiments, such code will be referred to an "HTML code." HTML code may be extracted by downloading web data from a web server, such as the web servers, 140, of FIG. 1, above, where the web data may include whole webpages, webpage HTML code, webpage document object models (DOMs), and the like, and any combination thereof. The underlying code of the various webpages, as extracted at S320, may be structured as a "snapshot," with each snapshot including the code underlying a webpage at the instant of extraction, a time or date stamp recording the date of extraction, a URL tag describing the URL of the extracted webpage, and other, like, data features.

Where whole or fractional webpages are downloaded during HTML extraction at S320, HTML may be extracted from the whole or fractional webpages by application of a script, application, or other software function configured to extract HTML from whole or partial webpages. Further, where one or more DOMs are drawn during HTML extraction at S320, the contents of the "nodes" of the DOM, as well as the hierarchical structure described by the "links" of the DOM, may be parsed into HTML equivalents by application of a script, application, or other software function configured to convert DOMs into HTML code or code equivalents. The structure and composition of a webpage DOM may be understood in greater detail with reference to FIG. 6, below. Webpage HTML code may be stored in a temporary, permanent, or semi-permanent storage, such as the database 150.

At S330, the HTML code is fetched from storage. HTML code may be fetched from storage by an analytic server, such as the analytic server, 130, of FIG. 1, above, and may be held in the storage or memory of such a server for subsequent analysis and processing. Fetched HTML code may include full or partial HTML code for one or more webpages or webpage portions, and may be tagged, labeled, or otherwise identified with various data features including, without limitation, webpage source, webpage URL, access date, retrieval date, other, like, data features, and any combination thereof. In an embodiment, S330 is optional and the method may skip this processing of this step.

At S340, the extracted or retrieved code is scraped. For example, HTML code may be scraped at S340 by application of one or more scripts, applications, or other software features configured to extract webpage features and structures based on the HTML code underlying the same webpage. Scraping at S340 may include identifying and recording webpage elements and structure. In an embodiment, only visible webpage elements, such as text, image, banners, and the like, are recorded.

Webpage elements and structure may be identified by methods including, as examples and without limitation, application of various software packages and libraries, such as jQuery and JSON libraries, which may be configured to scrape HTML code to extract webpage features and structures. Webpage elements and structures detected by such methods may be recorded by appending the relevant HTML code sections with tags, labels, or other indications of the sections' relevant elements and structures, by creating a separate recording documenting the detected elements and structures and their corresponding HTML code sections, and by other, like, methods.

At S350, a snapshot ID is generated. A snapshot ID is may be a data element, such as tag or label, providing unique identification of a given webpage's underlying HTML code at the instant at which the webpage was accessed or captured. A snapshot ID is generated based on the webpage or webpages specified at S310 and code extracted at S320. Snapshot IDs may include data features such as, as examples and without limitation, the date the webpage was accessed, the date the webpage was retrieved at S330, the URL or URLs of the webpage or webpages, the user or client ID of the user or client requesting change detection, other, like, features, and any combinations thereof. Snapshot IDs may be returned as data elements attached or appended to the IDs' respective webpages or webpage HTML code files, as separate files indicating any relevant HTML or webpage files, as other, like, data elements, and any combination thereof.

At S360, page resources of the webpage are downloaded. Page resources are the contents of the elements of a given webpage. As an example, where a webpage includes a header with a "banner" element, the page resources for the same webpage may include a ".jpeg" file of an image displayed within the "banner" element of the header. Page resources may be retrieved from one or more web servers, such as the web servers, 140, of FIG. 1, above. Once downloaded, page resources may be stored in one or more memory or storage media including, without limitation, the memory or storage components of the analytic server, 130, of FIG. 1, above, the database, 150, also of FIG. 1, above, other, like, memory or storage media, and any combination thereof. In an embodiment, page resources are the contents of the visible elements of a given webpage.

At S370, the downloaded page resources and scraped elements are saved as a snapshot in the database. In an embodiment, the scraped elements include only visible elements, such as text, banners, images and the like. S370 further includes updating the database entry with the URL and ID of the stored snapshot. The snapshot may be saved together with the creation time.

Figure 4:
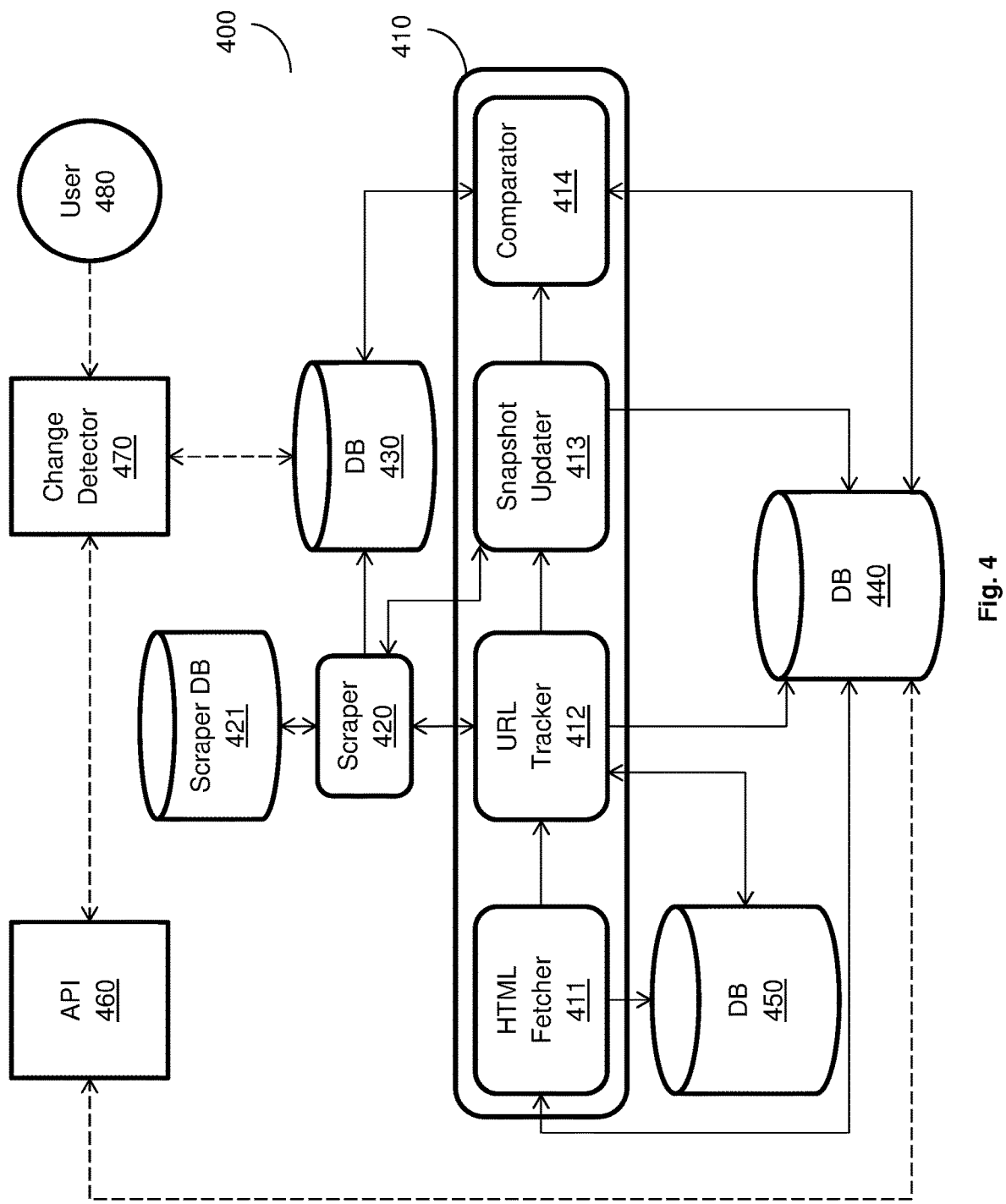
FIG. 4 is an illustration depicting an architecture for detecting changes in a webpage, according to an embodiment.

FIG. 4 is an example illustration 400 depicting an architecture for detecting changes in a webpage, according to an embodiment. The illustration depicts an example computing architecture which may be relevant to the execution of one or more methods described herein, among other, like, architectures. The architecture depicted in the illustration 400 may be a physical system, including exclusively hardware components, a fully-virtualized system, or an integrated physical-virtual system. It may be understood that while the architecture included in the illustration 400 is disclosed, other, like, architectures may be equally applicable without loss of generality or departure from the scope of the disclosure. Further, the architecture included in the illustration 400 may be implemented as software, hardware, firmware, or any combination thereof.

An architecture applicable for executing the processes described herein, including the architecture depicted in the illustration 400, may include an operation manager 410. The operation manager 410 may be configured to manage the operation of its sub-components, 411 through 414, and to execute the various methods described herein on a variety of bases, including, without limitation, periodic operation as described at S210 of FIG. 1, above.

The operation manager 410 may include an HTML fetcher 411 which may be configured to retrieve unprocessed URLs from the database 440 and extract HTML for each retrieved unprocessed URL, storing the extracted HTML to the database 450.

The operation manager 410 may further include a URL tracker 412. The URL tracker 412 may be configured to initiate operation of the scraper 420 for the HTML of each URL. Once initiated, the scraper 420 may create an entry in the scraper database 421 for each snapshot and may receive a snapshot ID from the scraper database 421 for each snapshot. Further, the scraper 420 may be configured to download page resources and store the downloaded page resources in a database or data warehouse, including a web-based database or data warehouse, such as the database 430.

The database 430 may include the AWS® S3 platform. The URL tracker 412 may be further configured to connect to the database 440 and the database 450 for purposes including, without limitation, retrieving operation instructions and data, storing operation outputs or data held in temporary memory, for other, like, purposes, and any combination thereof.

The operation manager 410 may also include a snapshot updater 413. The snapshot updater 413 may be further configured to retrieve snapshot IDs from the scraper 420 for specified URLs. In an embodiment, operation of the snapshot updater 413 may occur on a regular, looping, or other persistent basis. Further, where snapshot URLs are successfully retrieved from the scraper 420, the same snapshot URLs may be applied to update a "snapshot URL" table or list in the database 440.

In addition, the operation manager 410 may include a comparator 414. The comparator 414 may be configured to compare available snapshots. Further, the comparator 414 may be configured to store detected changes and change targets to the database 440 for subsequent application or review.

In addition to those components described with respect to the operation manager 410, an architecture, such as that depicted in the illustration 400, may further include an application programming interface (API) 460 and a change detector 470. The API 460 may be configured to return collected, processed, or otherwise-relevant data in one or more predefined data formats including, as an example and without limitation, JSON. Further, the change detector 470 may be configured to receive inputs from a user 480, to interface with other components or aspects of the architecture to provide for adjustment of the methods and processes described herein, and to display data, results, and other outputs for review by the user 480.

Figure 5:
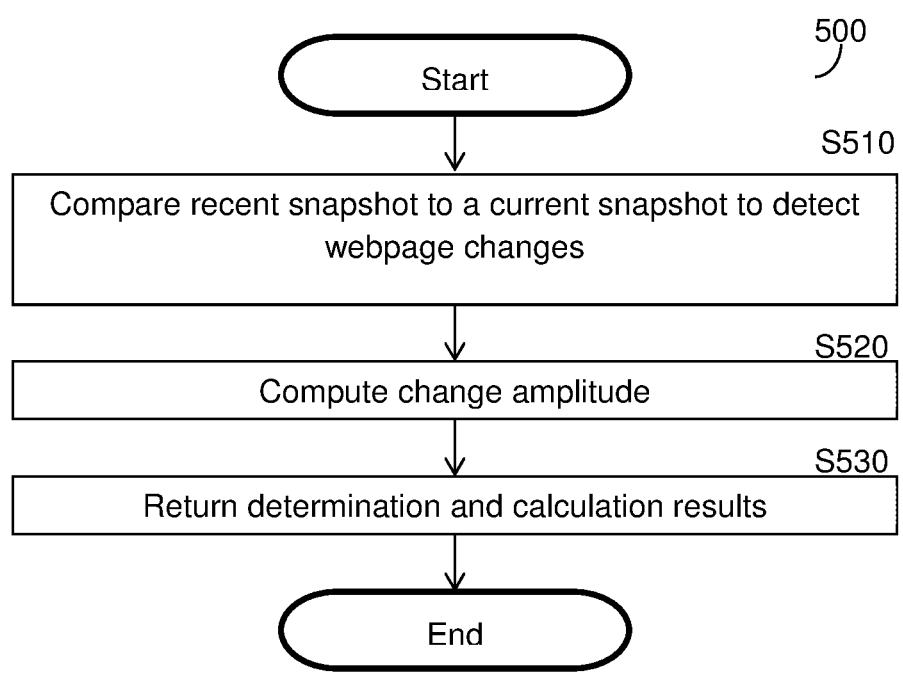
FIG. 5 is a flowchart describing a method for comparing snapshots of a webpage to detect changes therein, according to an embodiment.

FIG. 5 is an example flowchart 500 describing a method for comparing snapshots of a webpage to detect changes therein, according to an embodiment.

As noted above, the comparison may be made between a recent snapshot and the current snapshot, created or otherwise retrieved from the database. The current snapshot relates to a recent version of a webpage of a given URL. The recent snapshot may be identified by analysis of snapshot IDs for snapshots of a given URL.

At S510, webpage changes are detected by comparison of snapshot DOM element hashes. Snapshot DOM element hashes are unique low-file-size representations of elements or "nodes" in a DOM, generated by application of a hashing algorithm to the various elements or "nodes" included in a snapshot's DOM. A snapshot's DOM may be included in the snapshots, including both current and most-recent snapshots.

Where snapshot DOMs included in the snapshots are successfully extracted therefrom, snapshot DOM elements or nodes may be hashed by application of one or more hashing algorithms, as described previously, to generate unique hashes for each element or "node" of the respective snapshot DOMs. Snapshot DOM hashes may be compared by iterating through the elements or "nodes" of the recent snapshot's DOM, comparing the hashes of each element or "node" with the hash of the corresponding element or "node" in the current snapshot's DOM. A change may be detected where the recent snapshot DOM includes an element or "node" not included in the current snapshot DOM, where the current snapshot DOM includes an element or "node" not included in the recent snapshot DOM, or where the recent and current snapshot DOMs include matching elements or "nodes" with non-matching hash values.

Following detection of changes at S510, changes detected, as well as the target elements of such changes, may be recorded and saved to a memory or storage. Changes and change targets may be recorded in formats including, without limitation, tagged or labeled HTML or DOMs, change and change target tables or lists, other, like, formats, and any combination thereof. Changes and change targets may be saved to the database, 150, of FIG. 1, above.

At S520, change amplitudes are computed. Change amplitudes describe the relative impacts of various changes on a webpage as a whole. An amplitude is computed as fractions between zero and one, where a change amplitude of zero may be calculated for a change having no impact on the webpage, and where a change amplitude of one may be calculated for a change which completely affects the entire webpage. Change amplitudes may be computed for one or more changes detected at S510 and may be calculated on a variety of bases including, without limitation, calculation only for changes to certain element types, calculation only for changes on certain pages, other, like, bases, and any combination thereof. For each change considered in computing change amplitudes, a change amplitude may be determined according to one or more solutions. In an embodiment, a first solution for computing change amplitude describes the amplitude of a given change according to the following equation:

$$A = \frac{\frac{G_1}{T_1} + \frac{G_2}{T_2}}{2}$$

In the equation above, the first measure of change amplitude, A, is given as the sum of the quotient of the area of the changed element in the recent snapshot, given as $G_1$, divided by the overall area of the recent snapshot, given as $T_1$, plus the quotient of the area of the changed element in the current snapshot, given as $G_2$, divided by the overall area of the current snapshot, given as $T_2$, where the sum of the quotients is subsequently divided by two. The areas of the changed elements and the snapshot may be determined by multiplying the width of the elements and snapshots by the elements' and snapshots' respective lengths.

A second change amplitude measure is given according to the following equation:

$$B = \frac{G_1 + G_2}{T_1 + T_2}$$

Here, the second measure of change amplitude, B, is given as the quotient of the sum of the areas of the changed element in the recent and current snapshots, $G_1$ and $G_2$, respectively, divided by the sum of the areas of the recent and current snapshots, $T_1$ and $T_2$, respectively. The respective areas of the changed element and snapshot in the recent and current snapshots may be computed as described hereinabove.

Both the first and second measures of change amplitude, A and B, respectively, provide values between zero and one, following a normal distribution centered at one-half, with approximate standard deviations of one-half. It may be understood that the first and second measures may be used independently or in any combination to provide descriptions of webpage change amplitudes.

At S530, change determination and change amplitude results are returned. Change determination and change amplitude results may be returned by one or more means including, without limitation, inclusion in a change report, display through a screen or other feature of a user device, such as the user device, 120, of FIG. 1, above, archival in one or more storage media, including the database, 150, of FIG. 1, above, by other, like, means, and any combination thereof. Change determination and change amplitude results may be further appended to one or more change detection datasets to provide ongoing analysis of detected changes and change amplitudes.

Figure 6:
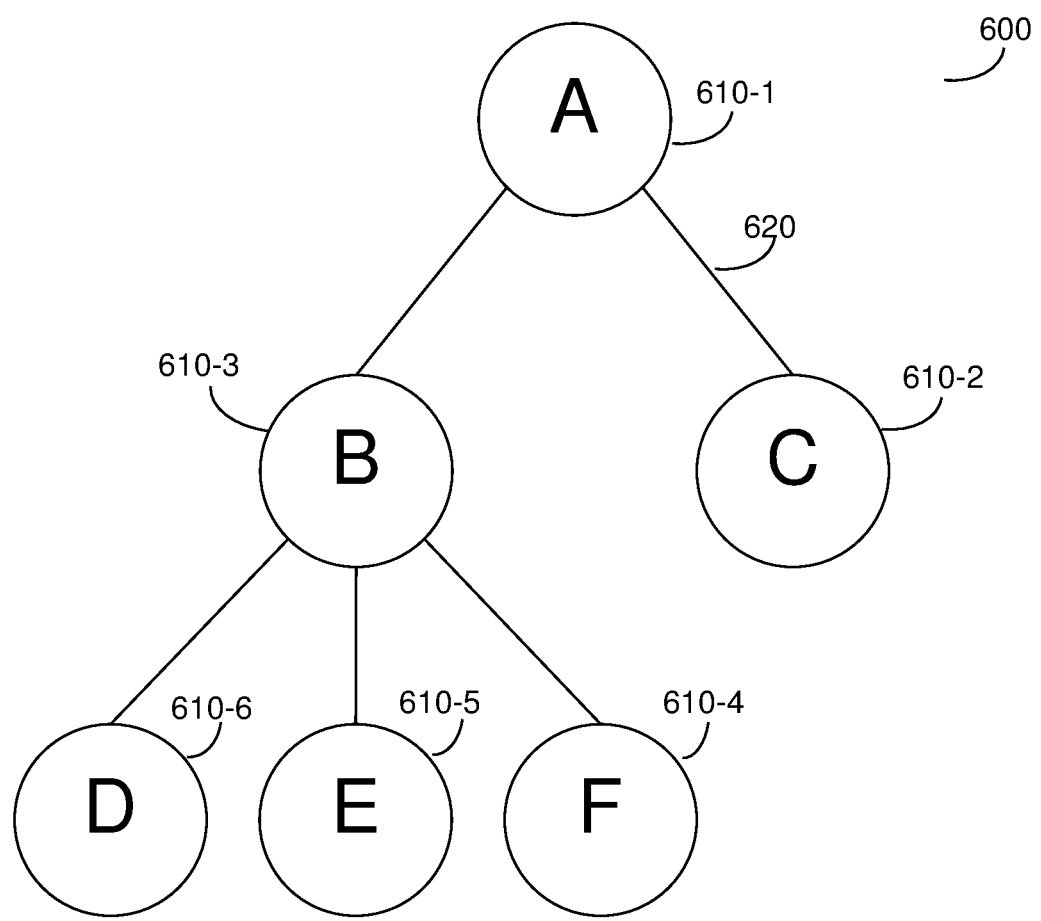
FIG. 6 is a diagram depicting a document object model (DOM) tree, according to an embodiment.

In an embodiment, returning change determinations and change amplitude results at S530 may further include returning metric correlations. As noted above, metric correlations are data features describing relationships between various metrics of interest and the determined changes and change amplitudes FIG. 6 is an example diagram depicting a document object model (DOM) tree 600, according to an embodiment. The DOM tree 600 provides a visual representation of the hierarchical structure of a webpage's HTML code, with content zones or elements represented as nodes, 610-1 through 610-6 (hereinafter, "nodes" 610). In the example DOM tree 600, related nodes 610 are joined by "links" 620, representing the relationships between two nodes 610. In the example DOM tree 600, links 620 are established between nodes 610-1 and 610-2 and between nodes 610-3 and 610-1. In the example DOM tree 600, nodes 610-3 and 610-2 are disposed on a second tier below the first tier occupied by node 610-1, reflecting a structure wherein the content element or zone represented by node 610-1 includes the content elements or zones represented by nodes 610-2 and 610-3. Although only the link 620 between nodes 610-1 and 610-2 is labeled, this label is provided for simplicity, and other, like, links 620 may be likewise labeled without loss of generality or departure from the scope of the disclosure.

Figure 7:
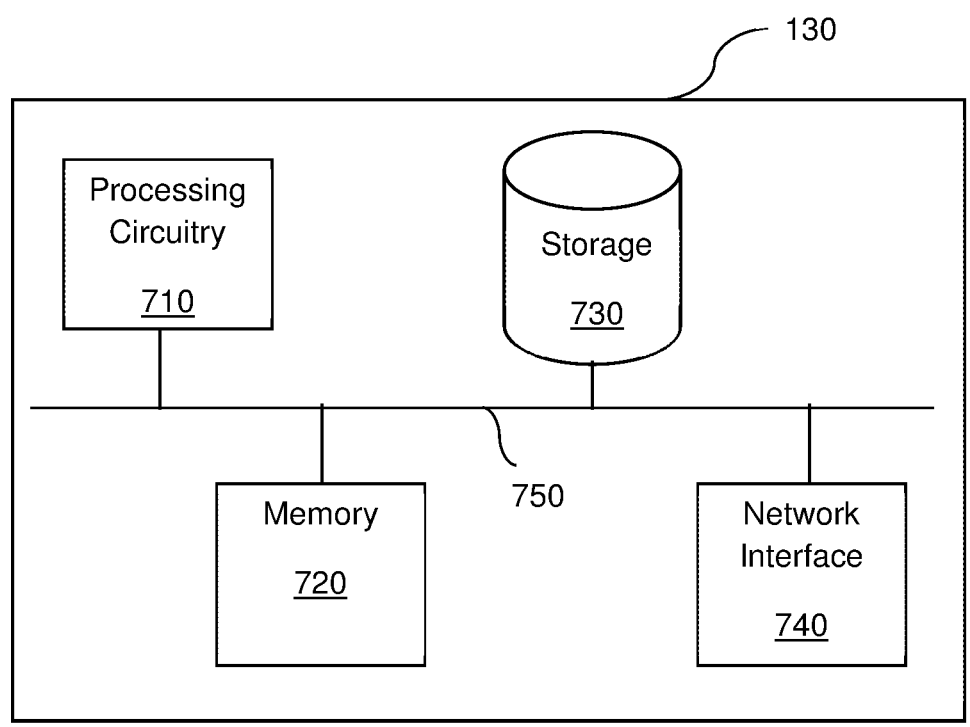
FIG. 7 is a schematic diagram of an analytic server, according to an embodiment.

FIG. 7 is an example schematic diagram of an analytic server 130, according to an embodiment. The analytic server 130 includes a processing circuitry 710 coupled to a memory 720, a storage 730, and a network interface 740. In an embodiment, the components of the server 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read-only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the analytic server 130 to communicate with the various components, devices, and systems described herein for detecting webpage changes and for other, related, purposes.

It should be understood that the embodiments described herein are not limited to the specific architecture illustrated in FIG. 7, and other architectures may be equally used without departing from the scope of the disclosed embodiments.

The disclosed embodiments have been discussed with a reference to a specific embodiment of detecting changes in webpages. However, it should be noted that disclosed embodiments can be utilized in any applications, such as mobile applications, web applications, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Further, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method comprising:
creating, by a processor, a current snapshot for a webpage associated with an identifier, wherein a received request for detecting changes in the webpage comprises the identifier, wherein the current snapshot is associated with a most recent version of the webpage;
retrieving at least one recent snapshot of the webpage, wherein the at least one recent snapshot is created immediately prior to the current snapshot and is associated with an immediate previous version of the webpage;
comparing the current snapshot to the at least one recent snapshot to detect a detected change, wherein the comparing is based on changes in visible elements in the webpage, the comparing comprising:
extracting a first filtered document object model (DOM) from first HTML code associated with the current snapshot and a second filtered DOM from second HTML code associated with the at least one recent snapshot of the webpage, the extracting comprising:
determining, from the first filtered DOM, a first set of nodes that is invisible to a site visitor of the webpage, and
filtering, from the first filtered DOM, the first set of nodes, and
detecting the detected change based on a comparison of a first hash value of a first node from the first filtered DOM and a second hash value of a second node from the second filtered DOM; and
generating a numerical value based on the detected change, wherein the numerical value is in a range from a first value of zero to a second value of one, wherein the numerical value being lower indicates a change having less impact on the webpage and the numerical value being higher indicates a change having a higher impact on the webpage.

2. The method of claim 1, further comprising:
causing the detected change to be displayed by a client device based at least in part on the numerical value,
wherein the first value of zero corresponds to a change having no impact on the webpage, the second value of one corresponds to a change that completely affects an entirety of the webpage.

3. The method of claim 1, wherein creating the current snapshot further comprises:
accessing the webpage associated with the identifier, wherein the identifier is a uniform resource locator (URL);
extracting code embedded in the webpage;
scraping the extracted code to identify elements of the webpage;
downloading contents of the identified elements of the webpage; and
generating the current snapshot based on the identified elements and contents.

4. The method of claim 3, further comprising:
generating a snapshot identifier (ID) based in part on the extracted code.

5. The method of claim 3, wherein the extracted code is HTML and wherein the identified elements are DOM elements of the webpage.

6. The method of claim 5, wherein the current snapshot includes DOM elements.

7. The method of claim I, wherein comparing the current snapshot to the at least one recent snapshot to detect the detected change further comprises:
determining from the second filtered DOM, a second set of nodes that is hidden by another element of the webpage; and
filtering from the second filtered DOM, the second set of nodes.

8. The method of claim 1, wherein generating the numerical value further comprises:
determining a first value based on a first quotient of an area of a changed element in the current snapshot and dividing the first quotient by an overall area of the current snapshot;
determining a second value based on a second quotient of the area of the changed element in the current snapshot and dividing the second quotient by the overall area of the current snapshot;
determining a sum of the first value and the second value; and
determining the numerical value based on the sum divided by two.

9. The method of claim 1, wherein generating the numerical value further comprises:
determining a first sum based on a first area of a changed element in the current snapshot and a second area of the changed element in a second snapshot;
determining a second sum based on a third area of the current snapshot and a fourth area of the second snapshot; and
determining the numerical value based on the first sum divided by the second sum.

10. The method of claim 1, further comprising:
computing at least one correlation metric, wherein a correlation metric describes relationships between at least one engagement metric of interest, the detected change, and the numerical value.

11. A non-transitory computer readable medium having stored thereon instructions for causing a processing circuitry to execute a process for detecting changes in webpages, the process comprising:
creating a current snapshot for a webpage associated with an identifier, wherein a received request for detecting changes in the webpage comprises the identifier, wherein the current snapshot is associated with a most recent version of the webpage;
retrieving at least one recent snapshot of the webpage, wherein the at least one recent snapshot is created immediately prior to the current snapshot and is associated with an immediate previous version of the webpage;
comparing the current snapshot to the at least one recent snapshot to detect a detected change, wherein the comparing is based on changes in visible elements in the webpage, the comparing comprising:
extracting a first filtered document object model (DOM) from first HTML code associated with the current snapshot and a second filtered DOM from second HTML code associated with the at least one recent snapshot of the webpage, the extracting comprising:
determining from the first filtered DOM, a first set of nodes that is invisible to a site visitor of the webpage, and
filtering from the first filtered DOM, the first set of nodes: and
detecting the detected change based on a comparison of a first hash value of a first node from the first filtered DOM and a second hash value of a second node from the second filtered DOM; and
generating a numerical value based on the detected change, wherein the numerical value is in a range from a first value of zero to a second value of one, wherein the numerical value being lower indicates a change having less impact on the webpage and the numerical value being higher indicates a change having a higher impact on the webpage.

12. A system comprising:
a processing circuitry; and
a memory, the memory containing instructions that, when executed by the processing circuitry, cause the system to perform operations comprising:
creating a current snapshot for a webpage associated with an identifier, wherein a received request for detecting changes in the webpage, wherein the current snapshot is associated with a most recent version of the webpage;
retrieving at least one recent snapshot of the webpage, wherein the at least one recent snapshot is created immediately prior to the current snapshot and is associated with an immediate previous version of the webpage;
comparing the current snapshot to the at least one recent snapshot to detect a detected change, wherein the comparing is based on changes in visible elements in the webpage, the comparing comprising:
extracting a first filtered document object model (DOM) from first HTML code associated with the current snapshot and a second filtered DOM from second HTML code associated with the at least one recent snapshot of the webpage, the extracting comprising:

determining, from the first filtered DOM a first set of nodes that is invisible to a site visitor of the webpage, and filtering, from the first filtered DOM, the first set of nodes; and detecting the detected change based on a comparison of a first hash value of a first node from the first filtered DOM and a second hash value of a second node from the second filtered DOM; and generating a numerical value based on the detected change, wherein the numerical value is in a range from a first value of zero to a second value of one, wherein the numerical value being lower indicates a change having less impact on the webpage and the numerical value being higher indicates a change having a higher impact on the webpage.

13. The system of claim 12, wherein the operations further comprise:

causing the detected change to be displayed by a client device based at least in part on the numerical value, wherein the first value of zero corresponds to a change having no impact on the webpage, the second value of one corresponds to a change that completely affects an entirety of the webpage.

14. The system of claim 12, wherein the operations further comprise:

accessing the webpage associated with the identifier, wherein the identifier is a uniform resource locator (URL):

extracting code embedded in the webpage;

scraping the extracted code to identify elements of the webpage;

downloading contents of the identified elements of the webpage; and generating the current snapshot based on the identified elements and contents.

15. The system of claim 14, wherein the operations further comprise:

generating a snapshot identifier (ID) based in part on the extracted code.

16. The system of claim 14, wherein the extracted code is HTML and wherein the identified elements are DOM elements of the webpage.

17. The system of claim 16, wherein the current snapshot includes DOM elements.

18. The system of claim 12, wherein the operations further comprise:

determining, from the second filtered DOM, a second set of nodes that is hidden by another element of the webpage; and filtering, from the second filtered DOM, the second set of nodes.

19. The system of claim 18, wherein the operations further comprise:

determining a first value based on a first quotient of an area of a changed element in the current snapshot and dividing the first quotient by an overall area of the current snapshot;

determining a second value based on a second quotient of the area of the changed element in the current snapshot and dividing the second quotient by the overall area of the current snapshot;

determining a sum of the first value and the second value; and determining the numerical value based on the sum divided by two.

20. The system of claim 19, wherein the operations further comprise:

determining a first sum based on a first area of a changed element in the current snapshot and a second area of the changed element in a second snapshot;

determining a second sum based on a third area of the current snapshot and a fourth area of the second snapshot; and determining the numerical value based on the first sum divided by the second sum.

21. The system of claim 19, wherein the operations further comprise:

computing at least one correlation metric, wherein a correlation metric describes relationships between at least one engagement metric of interest, the detected change, and the numerical value.

* * * * *

UNITED STATES PATENT AND TRADEMARK OFFICE
CERTIFICATE OF CORRECTION

| | | |
|---|---|---|
| PATENT NO. | : 11,561,962 B2 | |
| APPLICATION NO. | : 16/935404 | |
| DATED | : January 24, 2023 | |
| INVENTOR(S) | : Abdoun et al. | |

It is certified that error appears in the above-identified patent and that said Letters Patent is hereby corrected as shown below:

In the Claims

In Column 14, Line 56, in Claim 1, delete "nodes," and insert --nodes;-- therefor In Column 15, Line 29, in Claim 7, delete "claim I," and insert --claim 1,-- therefor In Column 15, Line 32, in Claim 7, delete "determining" and insert --determining,-- therefor In Column 15, Line 35, in Claim 7, delete "filtering" and insert --filtering,-- therefor In Column 16, Line 26, in Claim 11, delete "determining" and insert --determining,-- therefor In Column 16, Line 29, in Claim 11, delete "filtering" and insert --filtering,-- therefor In Column 16, Line 30, in Claim 11, delete "nodes:" and insert --nodes;-- therefor In Column 17, Line 1, in Claim 12, delete "DOM" and insert --DOM,-- therefor In Column 17, Line 29, in Claim 14, delete "(URL):" and insert --(URL);-- therefor Signed and Sealed this
Thirteenth Day of February, 2024

Katherine Kelly Vidal
*Director of the United States Patent and Trademark Office*